(12) United States Patent
Grüneberg et al.

(10) Patent No.: US 7,983,658 B2
(45) Date of Patent: Jul. 19, 2011

(54) METHOD AND SYSTEM TO ENABLE EMAIL SERVICES FOR MOBILE DEVICES

(75) Inventors: Lutz Wolfgang Grüneberg, Hannover (DE); Siegfried Ergezinger, Mettmann (DE)

(73) Assignee: Koninklijke KPN N.V, The Hague (NL)

( * ) Notice: Subject to any disclaimer, the term of this patent is extended or adjusted under 35 U.S.C. 154(b) by 329 days.

(21) Appl. No.: 10/565,955

(22) PCT Filed: Jul. 26, 2004

(86) PCT No.: PCT/EP2004/008380
§ 371 (c)(1),
(2), (4) Date: Jan. 26, 2006

(87) PCT Pub. No.: WO2005/015925
PCT Pub. Date: Feb. 17, 2005

(65) Prior Publication Data
US 2006/0190530 A1 Aug. 24, 2006

Related U.S. Application Data

(60) Provisional application No. 60/491,463, filed on Jul. 31, 2003.

(51) Int. Cl.
*H04M 3/42* (2006.01)
(52) U.S. Cl. ............ 455/414.1; 455/414.2; 455/414.3; 455/414.4; 455/461
(58) Field of Classification Search .......... 455/410–411, 455/414.1–414.4, 415, 418–420, 466, 41.2–41.3, 455/461, 432.3, 550.1, 551, 552.1, 557–558, 455/556.1–556.2, 560–561; 709/202–203, 218–219, 221–222, 228; 715/752
See application file for complete search history.

(56) References Cited

U.S. PATENT DOCUMENTS

| | | | | |
|---|---|---|---|---|
| 5,640,541 A * | 6/1997 | Bartram et al. | ................. | 703/26 |
| 5,978,566 A * | 11/1999 | Plank et al. | ................... | 709/206 |
| 6,684,248 B1 * | 1/2004 | Janacek et al. | ................ | 709/225 |
| 6,850,757 B2 | 2/2005 | Watanabe et al. | | |
| 6,885,861 B2 * | 4/2005 | Koskelainen | ............. | 455/414.2 |
| 6,947,738 B2 * | 9/2005 | Skog et al. | ................. | 455/426.1 |
| 6,973,481 B2 * | 12/2005 | MacIntosh et al. | ........... | 709/206 |
| 7,010,603 B2 * | 3/2006 | Martin et al. | ................. | 709/227 |
| 7,013,350 B2 * | 3/2006 | Enns et al. | .................... | 709/245 |
| 7,020,457 B2 * | 3/2006 | Poor et al. | .................... | 455/412.1 |
| 7,039,678 B1 * | 5/2006 | Halahmi et al. | .............. | 709/206 |
| 7,076,241 B1 * | 7/2006 | Zondervan | ................ | 455/412.1 |
| 7,155,479 B2 * | 12/2006 | Cover et al. | ................... | 709/203 |

(Continued)

FOREIGN PATENT DOCUMENTS
EP 1422899 A1 5/2004
(Continued)

*Primary Examiner* — Kwasi Karikari
(74) *Attorney, Agent, or Firm* — McDonnell Boehnen Hulbert & Berhoff LLP

(57) ABSTRACT

The invention is a method and a system, which allows the integration of email-enabled devices into a carrier service network without the need for user individual configuration of the devices. A system with an email proxy and a database is provided for handling email requests from a terminal. The network address of the terminal is used to retrieve email configuration settings from the database, whereupon the email proxy is able to communicate with an email server using the retrieved email configuration settings.

20 Claims, 3 Drawing Sheets

U.S. PATENT DOCUMENTS

| | | | |
|---|---|---|---|
| 7,173,933 B1* | 2/2007 | O'Rourke et al. | 370/389 |
| 7,275,095 B1* | 9/2007 | Lebouill | 709/223 |
| 2001/0023446 A1* | 9/2001 | Balogh | 709/229 |
| 2001/0034709 A1* | 10/2001 | Stoifo et al. | 705/51 |
| 2002/0046257 A1* | 4/2002 | Killmer | 709/218 |
| 2002/0078185 A1 | 6/2002 | Swerup et al. | |
| 2002/0122410 A1* | 9/2002 | Kulikov et al. | 370/349 |
| 2002/0126708 A1* | 9/2002 | Skog et al. | 370/522 |
| 2002/0152274 A1* | 10/2002 | Shino | 709/206 |
| 2003/0088693 A1* | 5/2003 | Cheung et al. | 709/238 |
| 2003/0174167 A1* | 9/2003 | Poo et al. | 345/752 |
| 2003/0191799 A1* | 10/2003 | Araujo et al. | 709/203 |
| 2004/0139204 A1* | 7/2004 | Ergezinger et al. | 709/229 |

FOREIGN PATENT DOCUMENTS

| | | |
|---|---|---|
| JP | 11-272581 | 10/1999 |
| JP | 2001-306463 | 11/2001 |
| JP | 2002-063116 | 2/2002 |
| JP | 2002-244979 | 8/2002 |
| JP | 2003-157280 | 5/2003 |

* cited by examiner

METHOD AND SYSTEM TO ENABLE EMAIL SERVICES FOR MOBILE DEVICES

FIELD OF THE INVENTION

The present invention relates to email services for devices. More specifically the present invention relates to the integration of email-enabled devices into a carrier service network.

BACKGROUND OF THE INVENTION

A large number of mobile terminals currently offered to be used in GSM based cellular networks includes features to send and retrieve email using the well defined and established internet protocols SMTP and POP3 over CSD, HSCSD, GPRS and UMTS.

Some Carriers offer email services to their customer base today, which can be used also to send and receive email with mobile terminals. But only a small number of customers are using this service offering.

One important reason for the limited market acceptance is the user individual configuration of the mobile terminal. Without this very technical and error prone configuration it is not possible to send and receive email on a mobile terminal.

To enable POP3/SMTP capable mobile terminals to use email services of a mobile operator, in existing solutions it is required to configure a number of parameters on the mobile terminal. These parameters include:

For email retrieval:
  Name of the email server to receive email from
  Username for email retrieval
  Password for email retrieval
To send email:
  Email address of the sender
  Name of the email server to be used for sending email
  Username for sending email (if necessary)
  Password for sending email (if necessary)

While some of the parameters are individual only for the mobile operators email service, others are specific for the individual user. This applies for:
  Username for email retrieval
  Password for email retrieval
  Email address of the sender
  Username for sending email (if necessary)
  Password for sending email (if necessary)

A significant number of parameters are required to be configured individually by the user.

The usual solution provided in the mobile operators environment to configure mobile terminals for certain services is named "over the air configuration" (OTA). This means to configure the terminal by sending a short message to the terminal with the individual configuration parameters. Since this message is formatted in special way, the receiving terminal interprets the message as a configuration command.

However, today's terminals usually do not offer the ability for email parameter configuration over the air. The user is left alone to configure the terminal as required. Additionally the service provisioning process of operators usually does not contain this configuration automatically. Therefore even if the phone can be configured over the air, the customer must be aware of this and obliged to get the configuration—which is unlikely in most cases.

WO02/49373A2 discloses a method and arrangement for configuring a mobile telephone. Like with other prior art it has the disadvantage that it is required to configure the phone (manually or automatically) before it can be used by the customer to access the operators mail service. Especially it is required to provide customer particular data like username, password or personal name. Another disadvantage is that in case the customer changes, or is forced to change, a part of his relevant configuration and individual data (e.g. mail address, username, password, mail server name), it is required to change or refresh the handset configuration. Yet another disadvantage is that a handset specific adoption of the service is required.

Problem Definition

The integration of email-enabled devices into a carrier service network require user individual configuration of each individual device, which is disadvantageous.

Aim of the Invention

The aim of the invention is to allow the integration of email-enabled devices into a carrier service network without the need for user individual configuration in the devices.

SUMMARY OF THE INVENTION

The invention is a method and a system, which allows the integration of email-enabled devices into a carrier service network without the need for user individual configuration.

According to a first aspect of the invention a system is provided for handling email requests from a terminal. The system comprises an email proxy and a database. The email proxy can be arranged to communicate with the database. The email proxy can be arranged to detect a network address of the terminal and retrieve email configuration settings from the database using the network address of the terminal. This is advantageous because it enables the terminal to access email services without being configured for the email services. The email configuration settings can include a name of the email server, and/or a username and a password for accessing the email server. This advantageously enables the terminal to access email services without being preconfigured with the name of the email server, username and/or password for accessing the email server. It is possible that the email configuration settings further include a full name of a user, and/or an email address of the user. This makes it even possible for the terminal to access email services without being preconfigured with a full name of the user and the email address of the user. The email proxy can be arranged to communicate with an email server using the email configuration settings.

The database can comprise a mapping of the network address of the terminal to an identity of a user. This advantageously enables the email configuration settings to be associated with the identity of the user instead of the network address of the terminal. A first database can comprise the mapping of the network address of the terminal to the identity of the user. A second database can comprise the email configuration settings. Using two databases can be advantageous when different parties supervise the mapping information and the email configuration settings.

A first email proxy can be used to handle email requests for retrieving email messages. A second email proxy can be used to handle email requests for sending email messages.

In a second aspect of the invention an email retrieval proxy is provided for handling email retrieval requests from a terminal. The email retrieval proxy can be arranged to detect a network address of the terminal and retrieve email configuration settings from a database using the network address of the terminal. The email retrieval proxy can further be arranged to forward the email retrieval request to an email server using the email configuration settings, retrieve a requested email message from the email server and forward the requested email message to the terminal.

In a third aspect of the invention an email sending proxy is provided for handling email sending requests from a terminal. The email sending proxy can be arranged to detect a network address of the terminal and retrieve email configuration settings from a database using the network address of the terminal. The email sending proxy can further be arranged to modify the email sending request using the email configuration settings and forward the modified email sending request to an email server using the email configuration settings.

In a fourth aspect of the invention a terminal is provided for use with a system as described above. The terminal can be provisioned with default configuration settings for sending or retrieving email messages, with the default configuration settings being the same for mobile terminals within a network. This is advantageous because it enables terminal manufacturers to equip terminals with default values. The mobile terminal can be arranged to send or retrieve email messages using the default configuration settings. This is advantageous because terminal users do not have to configure the terminal.

In a fifth aspect of the invention a method is provided for handling email requests from a terminal in an email proxy. The method can comprising the steps of detecting a network address of the terminal, retrieving email configuration settings from a database using the network address of the terminal and/or communicating with an email server using the email configuration settings. The email configuration settings can include a name of the email server and/or a username and a password for accessing the email server. The email configuration settings can further include a full name of a user and/or an email address of the user. The database can comprise a mapping of the network address of the terminal to an identity of a user.

The method can comprise the steps of retrieving from a first database information about the mapping of the network address of the terminal to the identity of the user and/or retrieving from a second database the email configuration settings.

A first email proxy can be used to handle email requests for retrieving email messages. A second email proxy can be used to handle email requests for sending email messages.

DETAILED DESCRIPTION OF THE INVENTION

Figure 1:
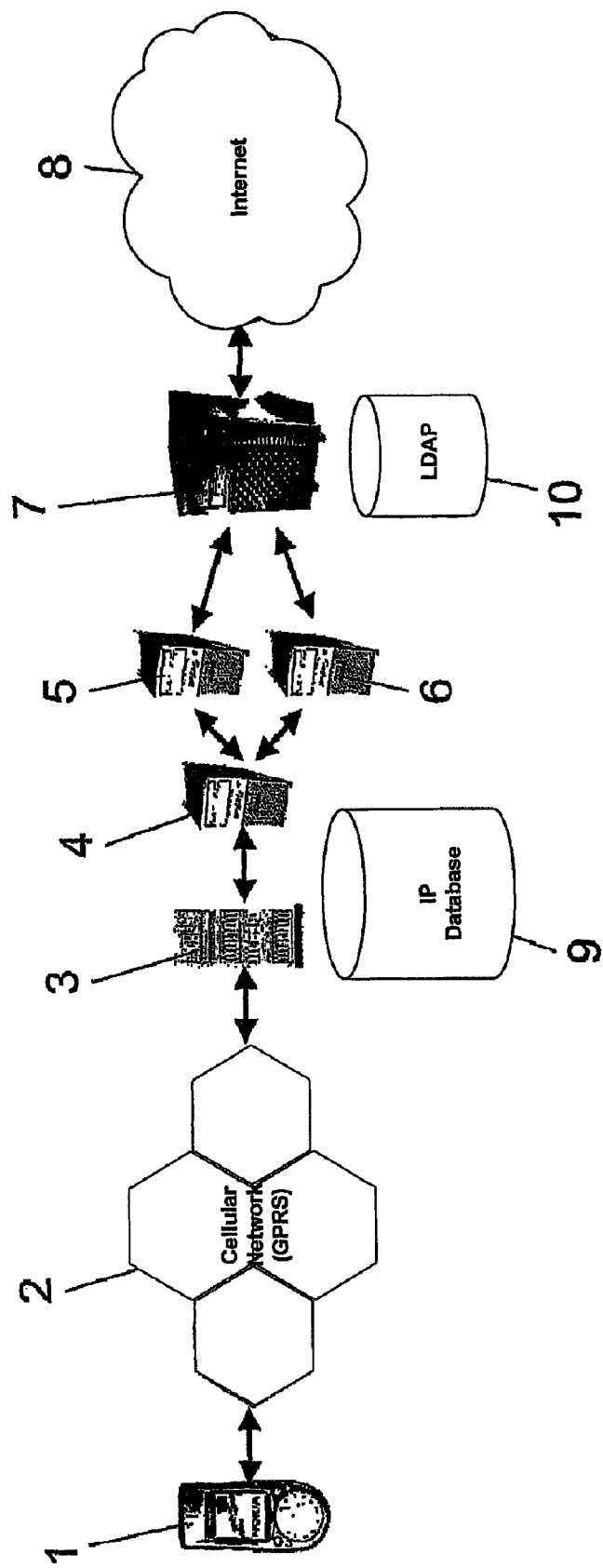
FIG. 1 shows an example of a network architecture comprising the present invention.

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being limited only by the appended claims as finally granted.

The invention is a method and a system, which allows the integration of email-enabled devices into a carrier service network without the need for user individual configuration.

The invention is applicable for most mobile operators to set up an attractive and relative simple mail server for their customers. Not only mail services of the mobile operator can be used with this system, also other mail service providers can be used, if the user is willing to provide the mobile operator with the required data and credentials.

Basically the invention is applicable also for DSL Service Providers and fixed Network ISPs.

The invention has the advantage that it increases the usability and convenience for the customer. Additionally it is advantageous for the operator, since the change of a password is usually not integrated into the operator's business processes at a level that will automatically send a configuration SMS or OTA message to the users mobile phone. Only a subset of mobile phones available on the market today, support OTA configuration or SMS configuration for email services, which is a disadvantage for existing solutions.

The invention can be explained as follows:

Mobile Terminal

Mobile terminals are equipped with default values for individual mobile operators by the mobile terminal manufacturer. This is common practice in the mobile telecommunications industry. The manufacturer is setting up the mobile terminal with default e-mail parameters for the individual mobile operator. This parameter set comprises on or more of the following items:

GPRS APN to be used by the individual mobile operator to send and retrieve email;

Mobile operator individual name for the email server to receive email from;

Mobile Operator individual default username for email retrieval;

Mobile Operator individual default password for email retrieval;

Mobile Operator individual email address of the sender;

Mobile Operator individual name for the email server to be used for sending email;

For sending email, the terminal will be configured to use standard SMTP without further authentication (no SMTP Auth);

Username and password for sending email remain unset.

Network & Service Delivery Platform

The network operator ensures that elements of the individual service platform are available at the IP addresses pre-configured in the handset for sending email (SMTP-Server) and mail retrieval (POP3-Server).

Additionally the mobile operator takes care, that during the communication link establishment conducted by the mobile handset, the individual MSISDN (or another user id) and the associated TCP/IP address leased to the handset are recorded (usually based on a RADIUS protocol request). Therefore the mobile operator is capable to map any active IP address in the named APN to the MSISDN and vice versa.

An example of a delivery platform is described by FIG. 1. In this figure the following elements are shown: handset (1), cellular GPRS network (2), GGSN (3), WAP gateway (4), POP3-proxy for mail retrieval (5), SMTP-proxy for mail sending (6), mail server (7), Internet (8), MSISDN/IP-address translation database (9) and operator LDAP (10).

In FIG. 1 a user with a POP3/SMTP capable handset is connected over the GSM/GPRS cellular network to the GGSN. TCP connections initiated by the mail user agent on the handset for retrieving mail from the mail server located on the right side of the figure lead over GGSN and WAP gateway.

They terminate on the POP3 proxy. TCP connections initiated by the mail user agent on the handset for sending mail using SMTP lead also over GGSN and WAP gateway. They terminate on the SMTP proxy.

The MSISDN/IP-Address translation database contains mapping information for all handsets attached to the GPRS network and allows to map the IP address of a handset to it's MSISDN and vice versa.

The operator LDAP includes particular information about customers like MSISDN, name of the email server to receive email from, username for email retrieval, password for email retrieval, user's email address for sending mail, name of the email server to be used for sending email, username for sending email (if necessary), password for sending email (if necessary). This information can be accessed by providing the customer's MSISDN.

Retrieving Mail

At the point in time the mobile terminal user is checking for new email, the mobile terminal will turn to the mobile operators POP3 server. The POP3 server is a non standard server. It takes the requesting IP address, looks up the associated MSISDN and receives the original users username and password from a database or a LDAP directory. Based on this information the POP3 proxy server authenticates the user against the corresponding backend server and retrieves the mail for the customer from the original server. The data stream received from the original users mail server is forwarded to the mobile handset without modifications.

Figure 2:
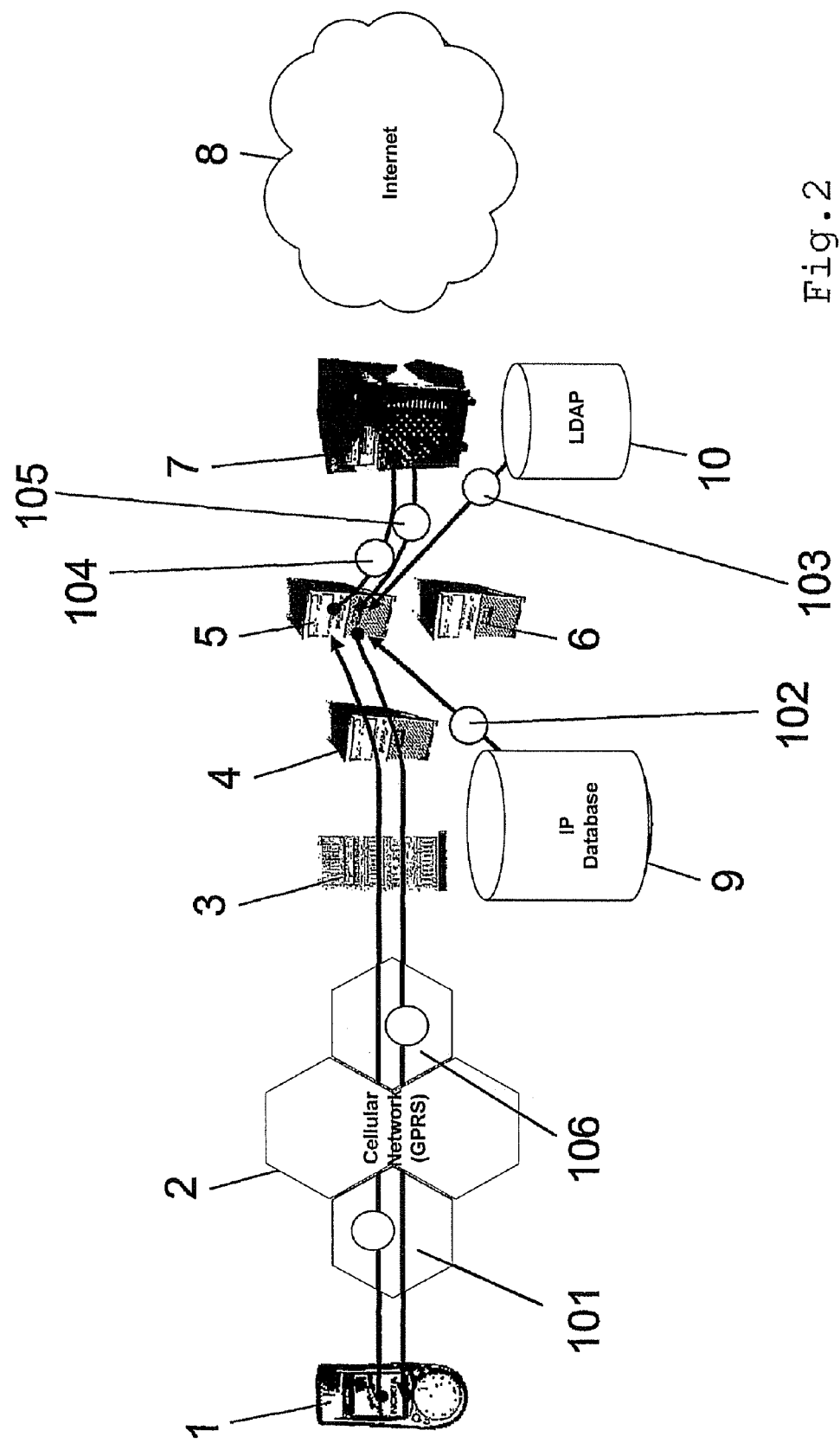
FIG. 2 shows an example of the steps for retrieving email messages according to an exemplary embodiment of the present invention.

An example of the course of steps to retrieve email is described by FIG. 2. In this figure the following elements are shown: handset (1), cellular GPRS network (2), GGSN (3), WAP gateway (4), POP3-proxy for mail retrieval (5), SMTP-proxy for mail sending (6), mail server (7), Internet (8), MSISDN/IP-address translation database (9) and operator LDAP (10).

The following steps are taken to retrieve email.

101: The mail user agent located on the handset connects to the POP3 proxy, authenticates itself with a predefined username and password and finally request the delivery of new mail. The authentication by predefined username and password does not provide any security. Each terminal will use the same username and password. Instead the POP3 proxy server identifies the customer by the IP address of his mobile terminal.

102: The POP3 proxy server uses the IP address used by the mobile terminal to lookup the customer's MSISDN from the MSISDN/IP address translation database.

103: The MSISDN found out with step 2 is used by the POP3 proxy server in step 3 to look up particular information about the customer from the operators LDAP: name of the email server to receive email from, username for email retrieval, password for email retrieval.

104: In step 4 this particular information is used by the POP3 proxy server to authenticate towards the original mail server using the POP3 protocol, instead of the user. By forwarding the mail retrieval request received from the handset, the necessary mail messages are retrieved from the original mail server.

105: The messages are transferred to the POP3 proxy server.

106: The POP3 proxy server forwards the retrieved messages to the handset.

Sending Mail

If a mobile user is going to send email from the mobile terminal, the mobile terminal will turn to the named SMTP server. This server is modified proxy version too. At the time of connection establishment, the server will look up the mobile users MSISDN and will retrieve the users email address, original SMTP server name, username and password from a database or a LDAP directory. Based on this information the SMTP proxy will replace the senders email address in the mail by the original email address of the mobile user. The so modified mail will be forwarded to the original SMTP mail server. If authentication is required, the SMTP proxy server will ensure this based on the original senders email address.

Figure 3:
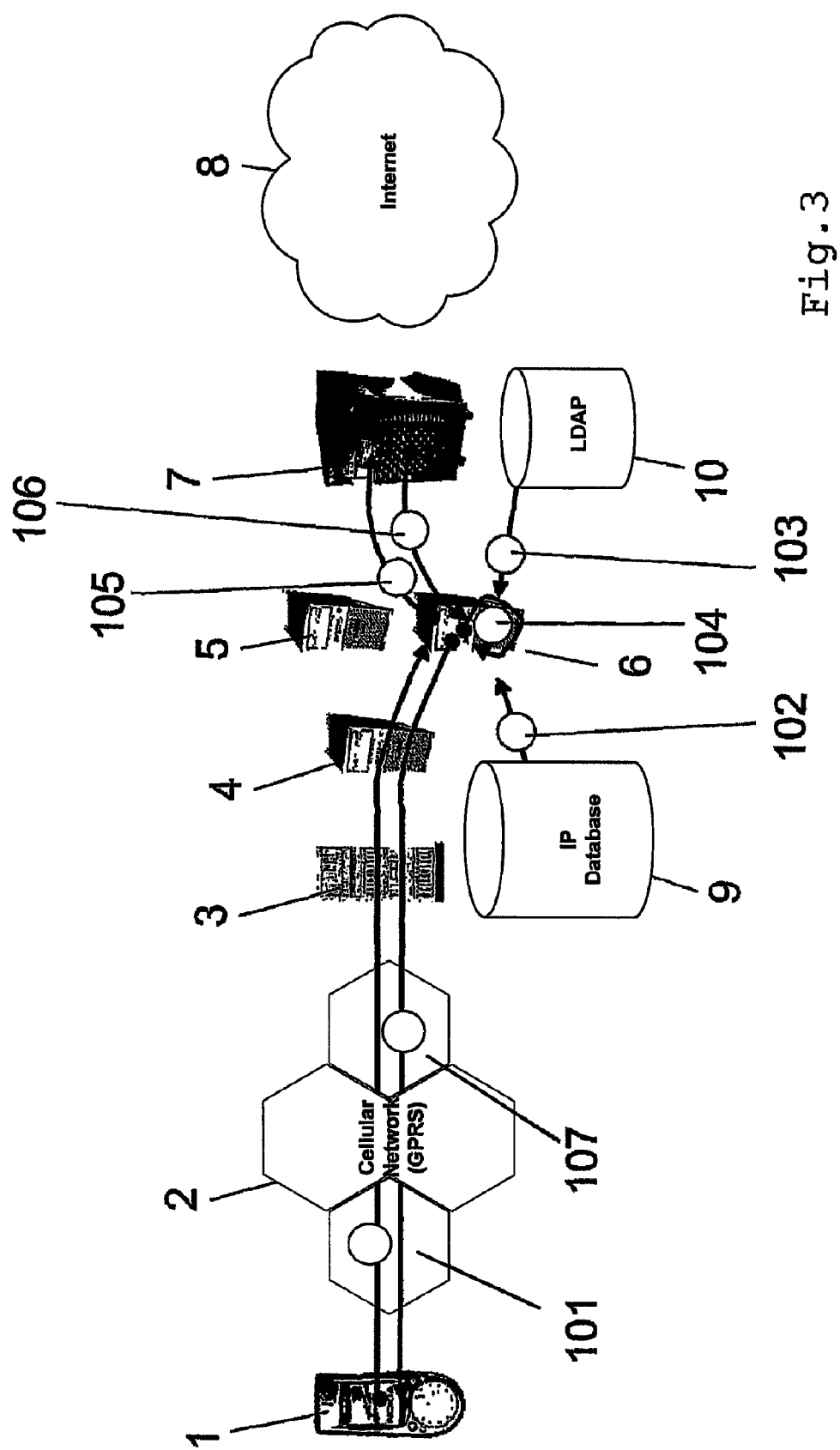
FIG. 3 shows an example of the steps for sending email messages according to an exemplary embodiment of the present invention.

An example of the course of steps to send email is described by FIG. 3. In this figure the following elements are shown: handset (1), cellular GPRS network (2), GGSN (3), WAP gateway (4), POP3-proxy for mail retrieval (5), SMTP-proxy for mail sending (6), mail server (7), Internet (8), MSISDN/IP-address translation database (9) and operator LDAP (10).

The following steps are taken to send email.

201. The mail user agent located on the handset connects to the SMTP proxy and delivers new mail to the SMTP proxy server. The SMTP proxy server identifies the customer by his IP address 202. The SMTP proxy server uses the IP address used by the mobile terminal to lookup the customer's MSISDN from the MSISDN/IP address translation database.

203. The MSISDN found out with step 2 is used by the SMTP proxy server in step 3 to look up particular customer information from the operators LDAP: name of the email server to be used for sending email, username for sending email (if necessary), password for sending email (if necessary).

204. Step 4 is characterized by a substitution process carried out by the SMTP proxy server. This translation replaces the default user data included in the mail from the handset by user data retrieved from the operator LDAP (username, senders e-mail address).

205. In step 5 the particular user information is used by the SMTP proxy server to authenticate towards the original mail server using the SMTP protocol instead of the user (if SMTP Auth is used). Finally the SMTP proxy server will forward the email received from the handset with applied replacements to the original mail server.

206. The SMTP proxy server receives a return message from the SMTP server.

207. This return message is forwarded to the handset.

ABBREVIATIONS USED

CSD Circuit switched Data
GPRS Global Packet Radio Service
GGSN Gateway GPRS Supporting Node
HSCSD High Speed Circuit Switched Data
IP Internet Protocol
ISP Internet Service Provider
LDAP Lightweight Directory Access Protocol
MSISDN Mobile Station ISDN Number
POP3 Post Office Protocol Version 3
SMTP Simple Mail Transfer Protocol
TCP Transmission Control Protocol
WAP Wireless Application Protocol

The invention claimed is:

1. A system for handling email requests received from a terminal, for sending email from and receiving email by the terminal, the system comprising:
at least one email proxy and a database, the email proxy being configured to communicate with the database, the database comprising user-specific email communication configuration settings for sending and receiving email to and from an email server on behalf of the terminal, wherein the email proxy is configured to, responsive to receiving an email request containing non-user-specific email communication configuration settings, detect a unique network address of the terminal and retrieve the user-specific email communication configuration settings from the database using the unique network address of the terminal and, without sending the retrieved user-specific email communication configuration settings back to the terminal, to communicate with the email server on behalf of the terminal using the retrieved user-specific email communication configuration settings.

2. The system according to claim 1, wherein the retrieved user-specific email communication configuration settings include a name of the email server, and a username and a password for accessing the email server.

3. The system according to claim 1, wherein the retrieved user-specific email communication configuration settings include a user-specific email address associated with a user of the terminal, and wherein a portion of the received email request identifying a non-user-specific email sender address is replaced with the user-specific email address.

4. The system according to claim 1, wherein the database comprises a mapping of the unique network address of the terminal to an identity of a user.

5. The system according to claim 4, wherein a first database comprises the mapping of the unique network address of the terminal to the identity of the user, and a second database comprises the retrieved user-specific email communication configuration settings.

6. The system according to claim 1, wherein a first email proxy is used to handle email requests for retrieving email messages, and a second email proxy is used to handle email requests for sending email messages.

7. A terminal for use with a system of claim 1,
the terminal being provisioned with non-user-specific email communication configuration settings for sending or retrieving email messages, the non-user-specific email communication configuration settings being the same for each mobile terminal operating within a network and are not associated with a user of the terminal, wherein the mobile terminal is configured to send email messages to or retrieve email messages from an email server on behalf of a unique user, via an email proxy, using only the non-user-specific email communication configuration settings.

8. The system according to claim 1, wherein the email proxy is further configured to replace the non-user-specific email communication configuration settings with the user-specific email communication configuration settings prior to communicating with the email server.

9. The system according to claim 1, wherein the email proxy is further configured to retrieve emails from the email server on behalf of the terminal using the retrieved user-specific email communication configuration settings, and to forward the retrieved emails to the terminal.

10. The system according to claim 1, wherein the unique network address of the terminal comprises an IP address associated with the terminal.

11. An email retrieval proxy for handling an email retrieval request received from a terminal for receiving email by the terminal,
wherein the email retrieval proxy is configured to detect a unique network address of the terminal and retrieve user-specific email communication configuration settings, for receiving email from an email server on behalf of the terminal, from a database using the unique network address of the terminal without sending the retrieved user-specific email communication configuration settings back to the terminal, and
wherein the email retrieval proxy is further configured to modify non-user-specific portions of the received email retrieval request using the retrieved user-specific email communication configuration settings, forward the modified email retrieval request to the email server using the retrieved user-specific email communication configuration settings, and to receive an email message from the email server and forward the received email message to the terminal.

12. An email sending proxy for handling an email sending request received from a terminal for sending email from the terminal,
wherein the email sending proxy is configured to detect a unique network address of the terminal and retrieve user-specific email communication configuration settings, for sending email to an email server on behalf of the terminal, from a database using the unique network address of the terminal without sending the retrieved user-specific email communication configuration settings back to the terminal, and
wherein the email sending proxy is further configured to modify non-user-specific portions of the received email sending request using the retrieved user-specific email communication configuration settings and to forward the modified email sending request to the email server using the retrieved user-specific email communication configuration settings.

13. A method for handling email requests from a terminal in at least one email proxy, for sending email from and receiving email by the terminal, the method comprising the steps of:
receiving an email request from the terminal at the at least one email proxy for sending email from and receiving email by the terminal, the email request comprising non-user-specific email communication configuration settings;
detecting, via the at least one email proxy, a unique network address of the terminal;
retrieving, via the at least one email proxy, user-specific email communication configuration settings, for sending and receiving email to and from an email server on behalf of the terminal, from a database using the unique network address of the terminal without sending the retrieved user-specific email communication configuration settings back to the terminal; and
communicating, via the at least one email proxy, with the email server using the retrieved user-specific email communication configuration settings in place of the non-user-specific email communication configuration settings in the email request.

14. The method according to claim 13, wherein the user-specific email communication configuration settings include a name of the email server, and a username and a password for accessing the email server.

15. The method according to claim 13, wherein the retrieved user-specific email communication configuration settings include a user-specific email address associated with a user of the terminal, and wherein the method further comprises replacing a portion of the received email request identifying a non-user-specific email sender address with the user-specific email address.

16. The method according to claim 13, wherein the database comprises a mapping of the unique network address of the terminal to an identity of a user.

17. The method according to claim 16, the method comprising the steps of retrieving from a first database information about the mapping of the unique network address of the terminal to the identity of the user; and retrieving, from a second database, the user-specific email communication configuration settings.

18. The method according to claim 13, wherein a first email proxy is used to handle email requests for retrieving email messages, and a second email proxy is used to handle email requests for sending email messages.

19. The method according to claim 13, the method further comprising the steps of:

retrieving emails from the email server on behalf of the terminal using the retrieved user-specific email communication configuration settings, and forwarding the retrieved emails to the terminal.

20. The method according to claim 13, wherein the unique network address of the terminal comprises an IP address associated with the terminal.

* * * * *